United States Patent

Wakamatsu

(10) Patent No.: US 9,513,492 B2
(45) Date of Patent: Dec. 6, 2016

(54) SHAKE CORRECTION APPARATUS AND CONTROL METHOD

(71) Applicant: CANON KABUSHIKI KAISHA, Tokyo (JP)

(72) Inventor: Nobushige Wakamatsu, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/557,787

(22) Filed: Dec. 2, 2014

(65) Prior Publication Data

US 2015/0160469 A1 Jun. 11, 2015

(30) Foreign Application Priority Data

Dec. 10, 2013 (JP) ................. 2013-255091

(51) Int. Cl.
*H04N 5/228* (2006.01)
*G03B 3/10* (2006.01)
*G02B 27/64* (2006.01)
*H04N 5/232* (2006.01)
*G03B 5/00* (2006.01)

(52) U.S. Cl.
CPC .............. *G02B 27/646* (2013.01); *G03B 5/00* (2013.01); *H04N 5/23245* (2013.01); *H04N 5/23258* (2013.01); *H04N 5/23287* (2013.01); *G03B 2205/0015* (2013.01); *G03B 2205/0069* (2013.01)

(58) Field of Classification Search
CPC ................ H04N 5/23212; H04N 5/23264; H04N 5/23287; H04N 5/23245; H04N 5/23258; H04N 5/228; G02B 27/646; G03B 3/10

See application file for complete search history.

(56) References Cited

U.S. PATENT DOCUMENTS

| 5,946,503 | A | 8/1999 | Washisu |
| 6,631,042 | B2 | 10/2003 | Noguchi |
| 8,873,942 | B2 | 10/2014 | Wakamatsu |
| 2001/0028516 | A1 | 10/2001 | Noguchi |
| 2006/0104620 | A1* | 5/2006 | Ebato ............... G02B 27/646 396/55 |
| 2008/0187306 | A1* | 8/2008 | Sugiura ............... G03B 5/02 396/349 |
| 2010/0134639 | A1* | 6/2010 | Takeuchi ........... H04N 5/23248 348/208.4 |
| 2011/0158618 | A1* | 6/2011 | Ibi .................... G02B 7/102 396/55 |
| 2012/0154615 | A1* | 6/2012 | Noguchi ........... H04N 5/23258 348/208.6 |
| 2012/0177354 | A1* | 7/2012 | Ashizawa ......... G02B 27/1006 396/133 |
| 2013/0004151 | A1 | 1/2013 | Wakamatsu |

FOREIGN PATENT DOCUMENTS

| JP | 5-215992 A | 8/1993 |
| JP | 2000-312329 A | 11/2000 |
| JP | 2001-290184 A | 10/2001 |

* cited by examiner

*Primary Examiner* — Aung S Moe
*Assistant Examiner* — John H Morehead, III
(74) *Attorney, Agent, or Firm* — Fitzpatrick, Cella, Harper & Scinto

(57) ABSTRACT

An shake correction apparatus includes a correcting unit configured to optically correct an image shake based on an output of a shake detecting unit; a moving member configured to hold the correcting unit; and a control unit configured to perform initialization driving of the correcting unit by driving the moving member during a start-up of the shake correction apparatus. The control unit converts at least one of a driving amplitude and a driving speed of the initialization driving of the moving member in response to the start-up mode of the shake correction apparatus.

6 Claims, 10 Drawing Sheets

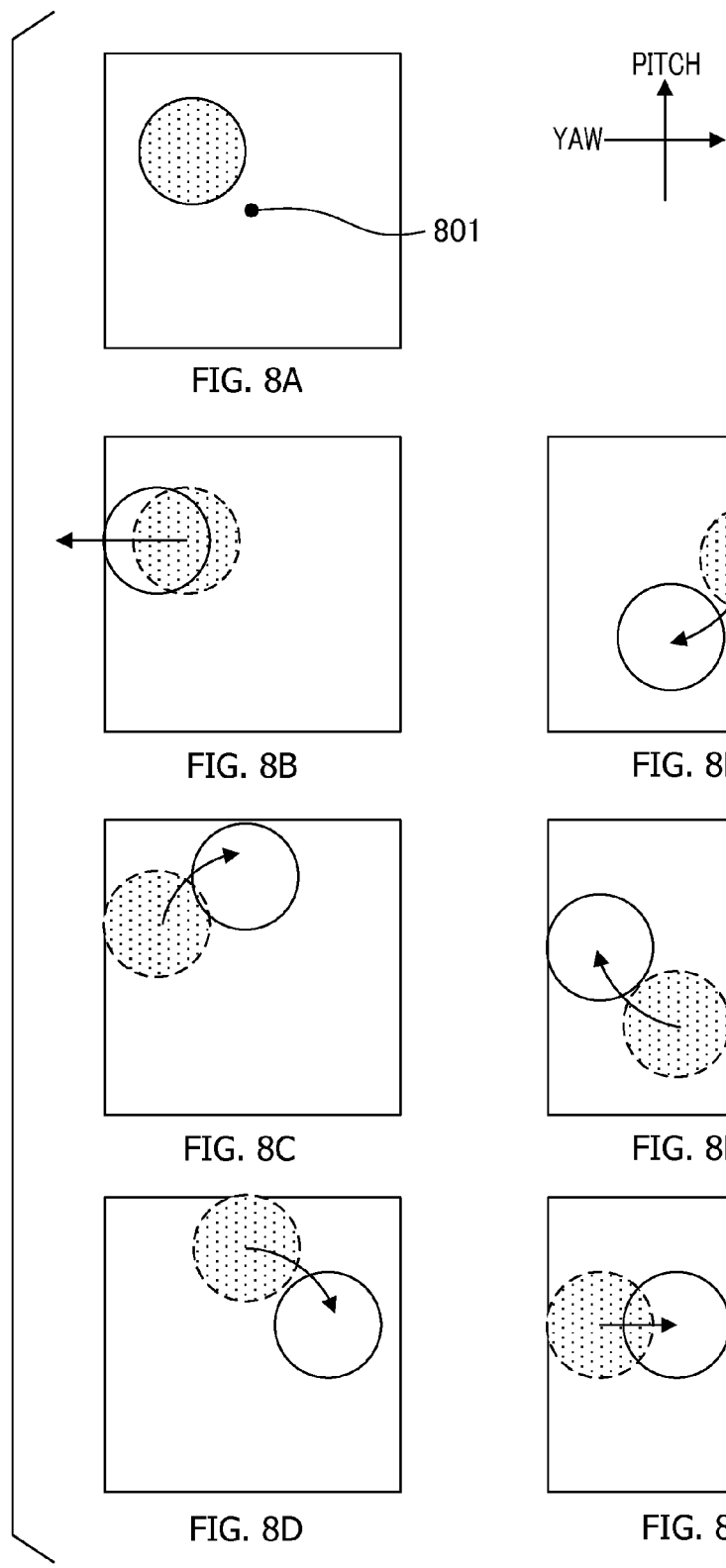

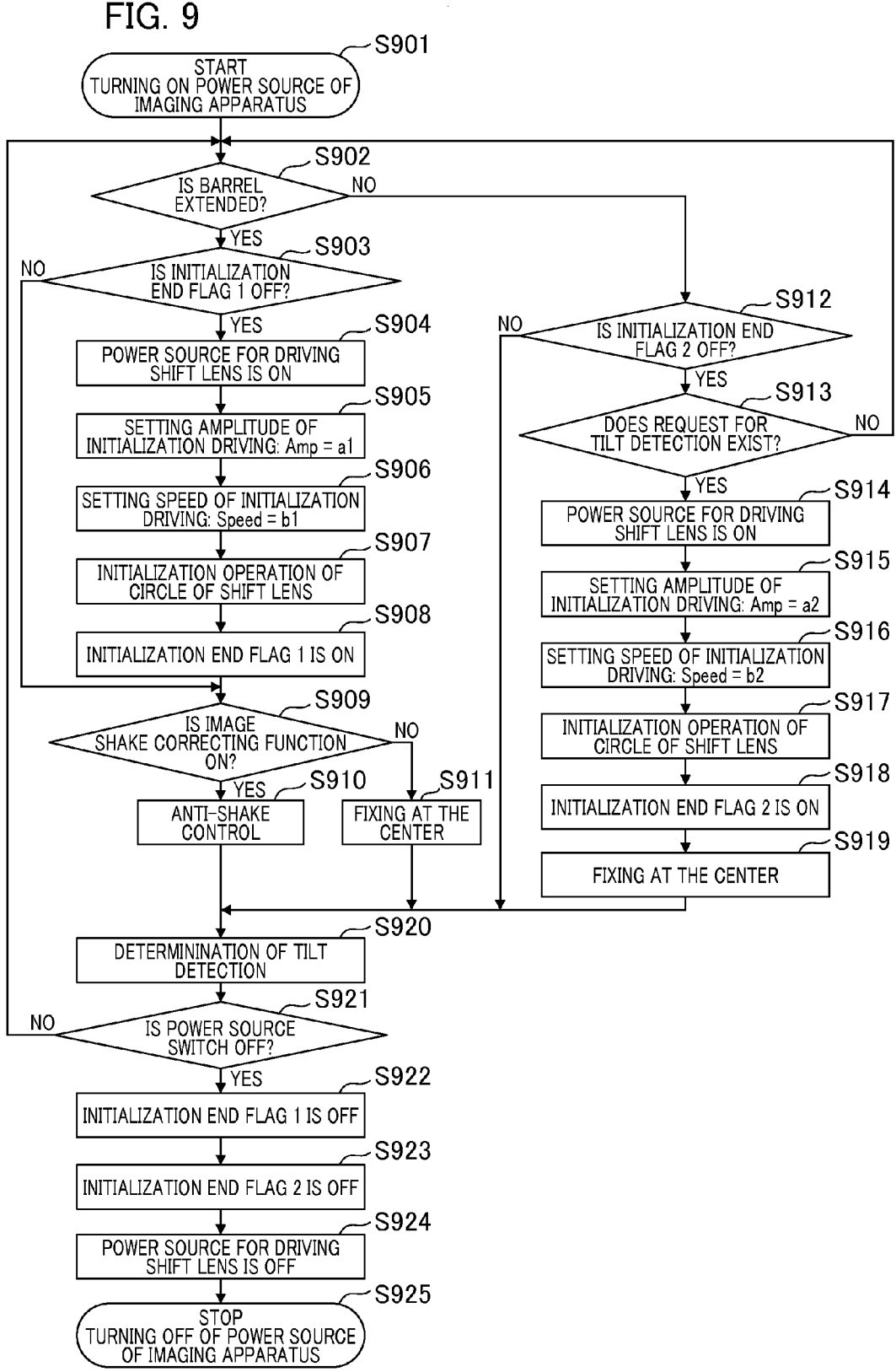

SHAKE CORRECTION APPARATUS AND CONTROL METHOD

BACKGROUND OF THE INVENTION

Field of the Invention

The present invention relates to a shake correction apparatus and to a control method therefor.

Description of the Related Art

There are an optical image shake correction processing and an imaging element image shake correction processing and the like, which serve as processing for correcting a shake (vibration) applied to an image pickup apparatus such as a still camera or a video camera from the outside. In the optical image shake correction processing, a shift lens (correction lens) is driven in a plane perpendicular to an optical axis. In the imaging element image shake correction processing, an imaging element is driven in the plane perpendicular to the optical axis. In the processing, the image pickup apparatus calculates an image shake correction amount by performing a cutoff of a predetermined frequency, and by performing a calculation that is centered on integration for matching an input/output unit, to a signal from a sensor for detecting a degree of the shake.

An angular velocity sensor is used for detecting a degree of the shake. The angular velocity sensor vibrates a vibration material such as a piezoelectric element at a constant frequency, and converts a force due to a Coriolis force that is generated by a rotary movement component into a voltage to obtain the angular velocity information. As shown in FIG. 10, a vertical direction (Pitch) and a horizontal direction (Yaw) are commonly used, which serve as directions for detecting the shake when the image pickup apparatus is located at a center of an orthogonal coordinate system.

In the optical image shake correction processing, a shake of an image (image shake) formed on the imaging element is removed by moving the shift lens, which moves in the plane perpendicular to the optical axis, serving as a correction means for correcting the image shake. In contrast, in the imaging element image shake processing, the shake of an image is removed from the image by moving the imaging element that serves as the correction means for correcting the image shake and moves in the plane perpendicular to the optical axis by the image shake correction amount. An explanation is provided of an example of a configuration of the optical image shake correction processing as below.

The image pickup apparatus for correcting the shake by using the optical image shake correction processing, firstly, commands a movement by the image shake correction amount to a shift lens driving unit, and obtains an actual position of the shift lens so that the shift lens that is a control target can be driven to a targeted value. Secondly, the image pickup apparatus executes feedback control, for example, PID control, so as to make a deviation between the target value and the actual position zero.

Desirable characteristics for the correction mechanism are, for example, an excellent tracking to a target with low friction, and an easy operability regarding a resonance frequency for a designer. As a mechanism for accomplishing the characteristics, Japanese Patent Laid-Open No. 2001-290184 discloses a shake correction mechanism for interposing a plurality of balls between a movable barrel and a fixed barrel and pressing by an elastic body.

In the shake correction mechanism disclosed in Japanese Patent Laid-Open No. 2001-290184, it is desirable that the ball is always in a rolling state because the tracking decreases according to the shift to the sliding friction of the ball while the ball contacts an end surface of a ball receiving unit. Accordingly, Japanese Patent Laid-Open No. 2001-290184 discloses that the movable barrel is moved by the maximum moving amount or the actual moving amount in advance, and initialization driving of the shift lens is performed.

Further, Japanese Patent Laid-Open No. H5-215992 discloses that the shake correction mechanism for extracting a signal in a gravity direction from a shake correction driving means and for detecting an attitude of the image pickup apparatus. Furthermore, Japanese Patent Laid-Open No. 2000-312329 discloses an image processing apparatus for detecting an attitude condition of the image processing apparatus during photographing, recording information of the attitude condition with photographing image data that is obtained by the photographing, and performing a rotation process of the photographing image data based on the attitude condition.

In the shake correction mechanism disclosed in Japanese Patent Laid-Open No. 2001-290184, the initialization operations of the shift lens during a start-up of the apparatus are same in each time. That is, the shake correction mechanism moves the shift lens by the maximum moving amount each time. However, if it is attempted to move the shift lens within a possible shortest time, a driving sound of the shift lens becomes large. When the driving sound of the shift lens becomes large, a harsh sound is generated each time at the start-up of the shift lens, and as a result, an the user has an uncomfortable feeling. While it is desirable that the driving sound of the shift lens is small, driving time of the shift lens influences the time between a start-up of a power source of the image pickup apparatus and a start-up of a system capable of performing photographing. Accordingly, if the initialization driving is performed for a long time, the time between the pressing of a power button and an available timing of the photographing is prolonged, and as a result, an the user has uncomfortable feeling.

In addition, an image pickup apparatus having a structure in which a lens barrel having, for example, a zoom lens and the shift lens, a focus lens, and an aperture/shutter unit is allowed to change the total length between an extended state (a state capable of photographing) and a collapsed state (a state that the barrel is accommodated when the photographing is not performed), is presumed.

In a case where the image pickup apparatus is set to the start-up mode where the lens barrel remains in the collapsed state during the start-up (for example, a play start-up mode enabling only a function for displaying the photographing image on a display unit such as an LCD), the sound is conspicuous if the sound caused by the initialization operation of the shift lens is large. In addition, in a case where the initialization operation time is prolonged for reducing the sound volume, the start-up time is prolonged.

SUMMARY OF THE INVENTION

The present invention provides a shake correction apparatus capable of achieving a reduction of a driving sound and a start-up time due to initialization driving of a shift lens in a start-up in a collapsed state of a barrel.

The shake correction apparatus according to one embodiment of the present invention includes a correcting unit configured to optically correct an image shake based on an output of a shake detecting unit; a moving member configured to hold the correcting unit; and a control unit configured to perform an initialization driving of the correcting unit by driving the moving member during the start-up of the shake correction apparatus. The control unit converts at least one of driving amplitude and driving speed of the initialization driving of the moving member in response to the start-up mode of the shake correction apparatus.

According to the shake correction apparatus of the present invention, it is possible to achieve the reduction of the driving sound and the start-up time due to the initialization driving of the shift lens in the start-up in the collapsed state of the barrel, by converting the driving amplitude and the driving speed of the initialization operation of the shift lens in response to the start-up mode.

Further features of the present invention will become apparent from the following description of exemplary embodiments (with reference to the attached drawings).

BRIEF DESCRIPTION OF THE DRAWINGS

FIG. 8A to 8G are explanatory diagrams of the examples of an initialization operation of the ball in the ball receiving part.

FIG. 9 is a flowchart explaining the initialization operation of the shift lens.

DESCRIPTION OF THE EMBODIMENTS

Figure 1:
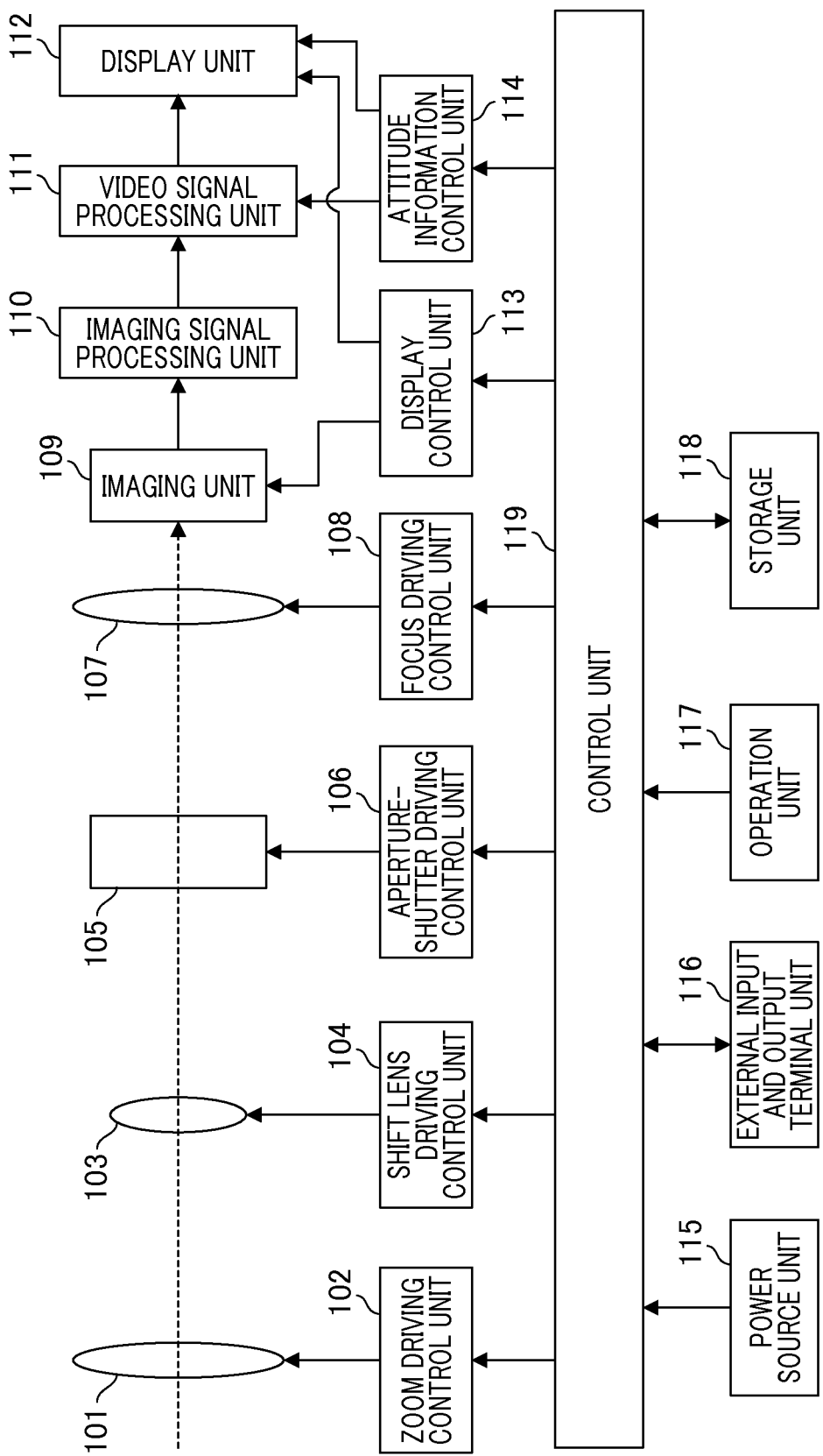
FIG. 1 is a diagram illustrating an example of a configuration of an image pickup apparatus of the present embodiment.

FIG. 1 is a diagram illustrating an example of a configuration of an image pickup apparatus of the present embodiment. In this example, the image pickup apparatus is a digital compact camera. Needless to say, an applicable range of the present invention is not limited to the digital compact camera. The present invention is applicable to a digital video camera, a monitoring camera, a webcam, and a mobile phone.

In FIG. 1, 101 is a zoom unit, and includes a zoom lens for performing variable magnification. 102 is a zoom driving control unit and controls the driving of the zoom unit 101. 103 is a shift lens which serves as a shift correction optical system, and is capable of changing the position in a substantially perpendicular plane to an optical axis. 104 is a shift lens driving control unit and controls the driving of the shift lens 103. In addition, the shift lens driving control unit stops power supply to the shift lens driving control unit 104 during power saving. 105 is an aperture-shutter unit. 106 is an aperture-shutter driving control unit and controls the driving of the aperture-shutter unit 105.

107 is a focus unit and includes a lens for performing focus adjustment. 108 is a focus driving control unit and controls the driving of the focus unit 107. 109 is an imaging unit using an imaging element and converts a light figure that is passed through each lens group into an electric signal. 110 is an imaging signal processing unit and performs a conversion processing of the electric signal that is output from the imaging unit 109 into a video signal. 111 is a video signal processing unit and processes the video signal that is output from the imaging signal processing unit 110 depending on the use.

112 is a display unit and displays an image as necessary based on the signal output from the video signal processing unit 111. 115 is a power source unit and supplies a power source to an total system depending on the use. 116 is an external input and output terminal unit and inputs and outputs a communication signal and the video signal between itself and the external. 117 is an operation unit for operating the system. 118 is a storage unit and stores various data such as video information. 114 is an attitude information control unit and sets an attitude of the image pickup apparatus to the video signal processing unit 111 and the display unit 112. 113 is a display control unit and controls the operation and the display of the imaging unit and the display unit. 119 is a control unit for controlling the total system.

Next, a description will be given of the operation of the image pickup apparatus having a configuration explained referring to FIG. 1. The operation unit 117 has a shutter release button that is configured so as to turn on a first switch (SW1) and a second switch (SW2) in turn according to the pushing amount.

The first switch is turned on when the shutter release button is half pressed, and the second switch is turned on when the shutter release button is fully pressed.

When the first switch of the operation unit 117 is turned on, the focus driving control unit 108 drives the focus unit 107 to perform focus adjustment and the aperture-shutter unit driving control unit 106 drives the aperture-shutter unit 105 to set to the appropriate exposure amount. In addition, when the second switch is turned on, image data obtained from the light figure that is exposed by the imaging unit 109 is stored in the storage unit 118.

At this time, when the operation unit 117 instructs the shift correction function to turn ON, the control unit 119 provides instructions for the shift correction operation to the shift lens driving control unit 104. The shift lens driving control unit 104 that receives the instruction performs the correction operation until instructed to turn the shift correction function OFF.

Moreover, in a case where the operation unit 117 is not operated during a definite period of time, the control unit 119 provides instructions to disconnect of the power source of the display for saving power. In the image pickup apparatus, it is possible to select either a still image photographing mode or a video image photographing mode by the operation unit 117, and it is possible to change the operation condition of each actuator control unit in each mode.

It is noted when the operation unit 117 is instructed to performing variable magnification by the zoom lens, a zoom driving control unit 102 that receives the instruction via the control unit 119 drives a zoom unit 101, and moves the zoom lens to the instructed zoom position. Further, based on the image information sent from the imaging unit 109 and processed at each signal processing unit 110 and 111, the focus driving control unit 108 drives the focus unit 107 and performs focus adjustment.

Figure 2:
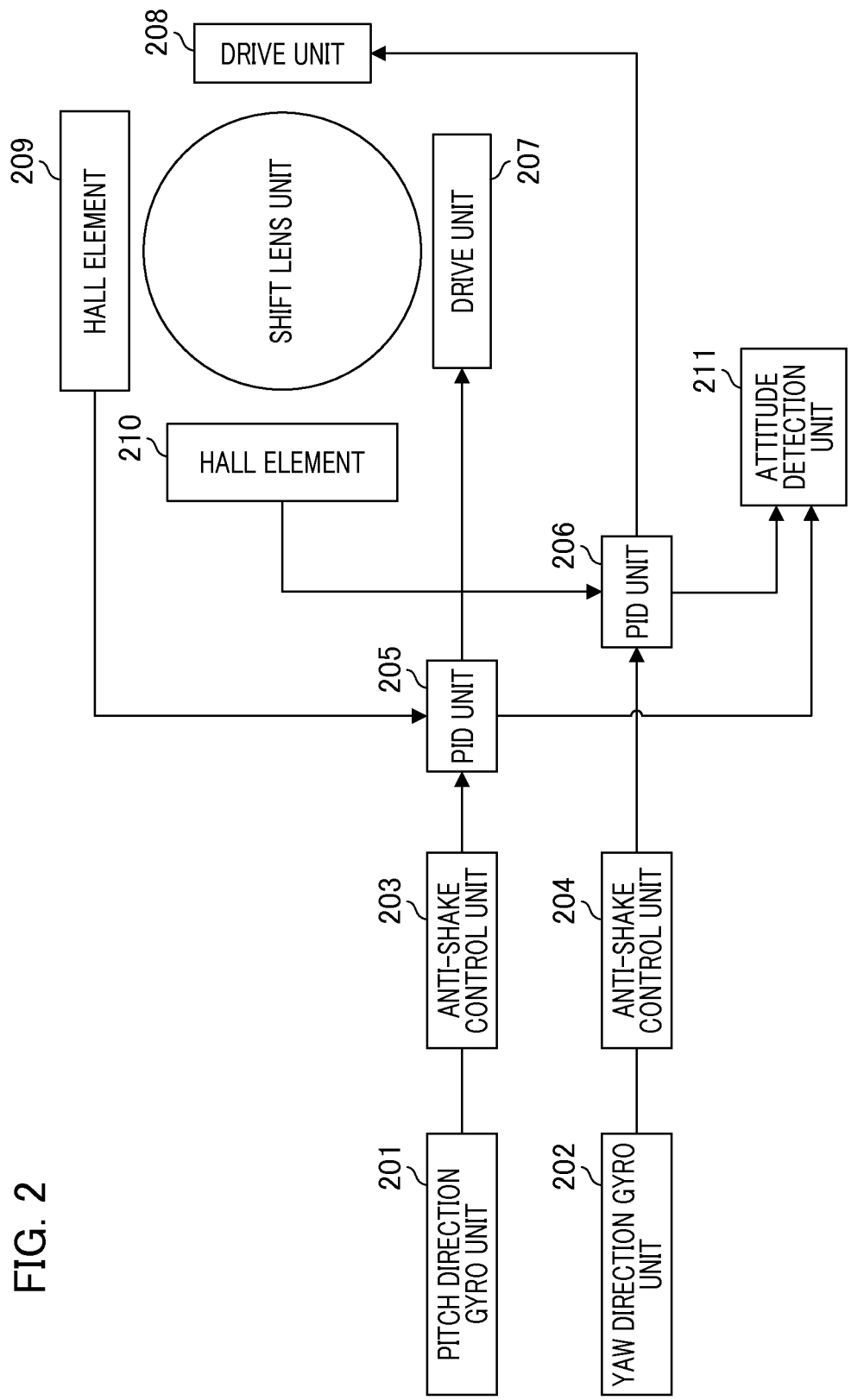
FIG. 2 is a block diagram illustrating an internal configuration of a shift lens driving control unit.

FIG. 2 is a block diagram illustrating an internal configuration of the shift lens driving control unit shown in FIG. 1. 201 is a pitch direction gyro unit and detects a shift in a direction perpendicular (pitch direction) to the image pickup apparatus in a natural attitude (an attitude whose length direction of the image frame closely matches the horizontal direction). 202 is a yaw direction gyro unit and detects the shift in a direction horizontal to the image pickup apparatus (yaw direction) in the natural attitude.

203 and 204 are anti-shake control units which serve as determination means for respectively determining the driving target positions in the pitch and yaw directions. 205 and 206 are PID units which serve as feedback control units, determine a control amount from a deviation between a correction position control signal in the respective pitch direction and yaw direction and a position signal showing a position of the shift lens 103, and output a position command signal. 207 and 208 are drive units and respectively drive the shift lens 103 based on the position command signal sent from the PID units 205 and 206. 209 and 210 are Hall elements and respectively detect positions of shift lens 103 in the pitch direction and the yaw direction.

Next, in the position control of the shift lens 103, the shift lens driving control unit 104 executes the following driving operations. Based on an information signal (angular velocity signal) showing the shake of the image pickup apparatus in the pitch direction and the yaw direction from the pitch direction gyro unit 201 and the yaw direction gyro unit 202, the shift lens driving control unit 104 drives the shift lens 103 in the respective directions. A magnet is attached to the shift lens 103, a magnetic field of the magnet is detected by the Hall elements 209 and 210, and the position signals showing the actual position of the shift lens 103 are sent to the respective PID units 205 and 206. The PID units 205 and 206 execute feedback controls so that the position signals respectively converge on the correction position control signals sent from the anti-shake control units 203 and 204.

It is necessary to adjust the output of the Hall elements 209 and 210 so that the shift lens 103 is moved to a predetermined position with respect to the predetermined correction position control signal because the position signal that is output from the Hall element 209 and 210 has dispersion. At this time, a PID control that selectively combines a proportional control, an integral control, and a derivative control is performed at the PID units 205 and 206. Further, an attitude detection unit 211 detects the attitude of the image pickup apparatus based on the signal used at the PID units.

The anti-shake control units 203 and 204 respectively output the correction position control signals for moving the position of the shift lens 103 in a direction for correcting the image shake due to the shake of the image pickup apparatus, based on the shake information signal from the pitch direction gyro unit 201 and the yaw direction gyro unit 202. The correction position control signal shows the driving target position. Accordingly, it is possible to prevent the image shake even a case where a hand shaking occurs in the image pickup apparatus.

Figure 3:
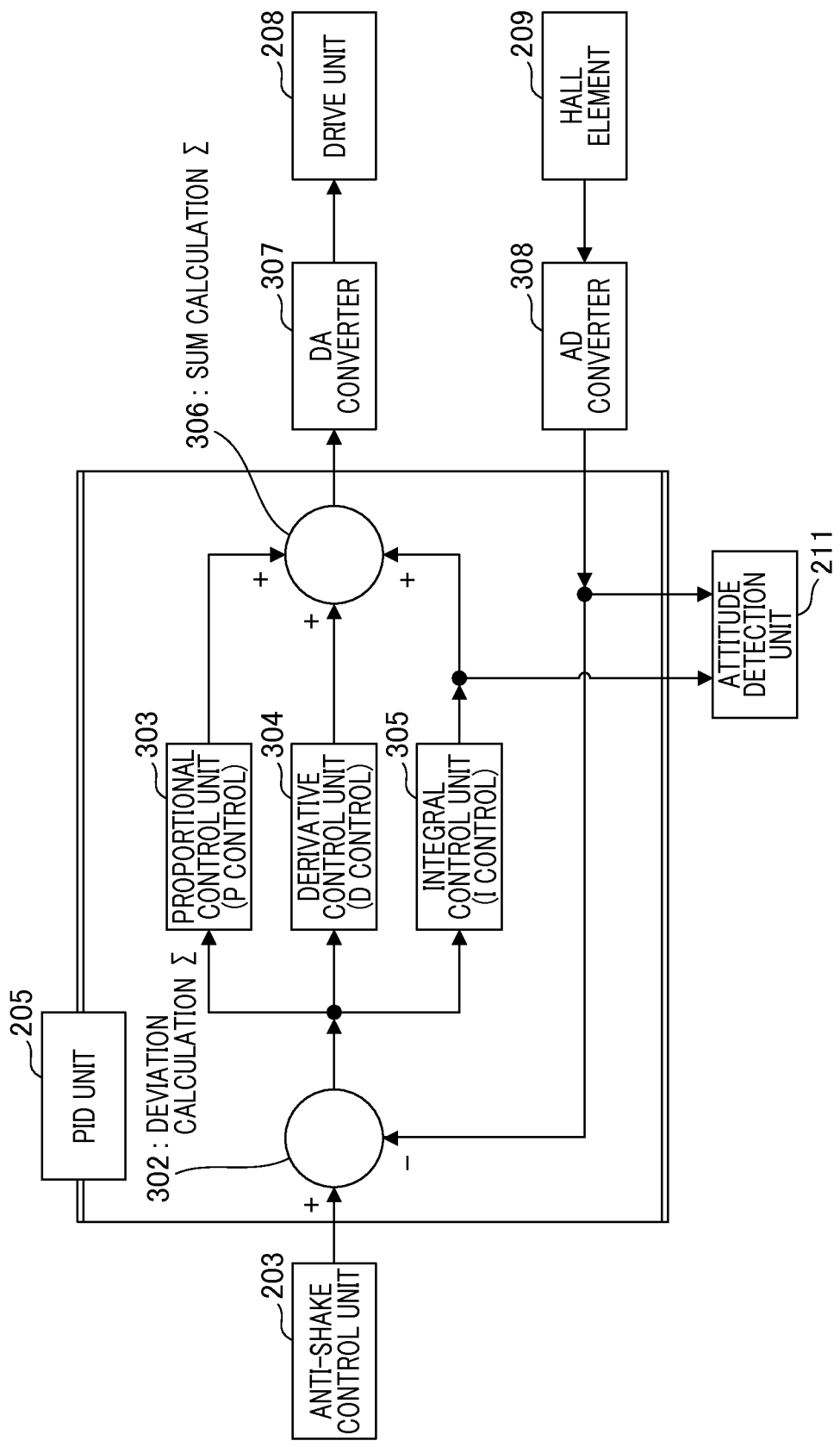
FIG. 3 is a functional block diagram of a PID unit provided in the shift lens driving control unit.

FIG. 3 is a functional block diagram of the PID unit provided in the shift lens driving control unit shown in FIG. 2. In the PID units 205 and 206, the corresponding directions are different, but the basic functions are same. Accordingly, in FIG. 3, explanation is provided for an example of a configuration of the PID unit 205.

The position signal that is the output value of the Hall element 209 is converted into a digital signal by an AD converter 308. A deviation calculator 302 calculates a difference (deviation) between a shake correction position and the actual position based on the digital signal that is output from an AD converter 308 and the shake correction position that is the output value of the anti-shake control unit 203.

The deviation is input to a proportional control unit 303 (P control unit), a derivative control unit 305 (D control unit), and an integral control unit 304 (I control unit), and the calculation is performed.

The proportional control unit 303 performs control for reducing the deviation to close to zero, that is, for bringing the shake position as the target position and the actual position close. However, an offset component is constantly added to the deviation only by the proportional control unit 303, and therefore the control for making the offset component approach zero is performed by the derivative control unit 305.

In a case where the attitude of the image pickup apparatus changes, that is, the direction of gravity added to the shift lens changes, the offset component shows variation according to the attitude change in a manner similar to the actual position of the shift lens. The actual position and the output of the integral control of the deviation are delivered to the attitude detection unit 211 for determining the attitude. Moreover, a derivative control unit 304 performs the derivative control to the deviation for improving responsiveness of the shift lens. Eventually, the results of the proportional control unit 303, the derivative control unit 304, and the integral control unit 305 are added by a sum calculation unit 306, and delivered to the drive unit 208 as an analog signal by a DA converter (unit) 307. The drive unit 208 drives the shift lens 103 based on the delivered analog signal.

Next, an attitude detection unit 211 will be explained. Because gravitational acceleration constantly becomes a force added to the shift lens, the gravitational acceleration is detectable by the output value of the integral control. In addition, since the gravitational acceleration can be obtained by removing the influence of an acceleration high frequency component by detecting the gravitational acceleration from the output of the integral control, and thereby chattering is prevented when the attitude change is detected. Here, in the case of the configuration in which the shift lens is hung by a spring, it is necessary to consider the spring force according to the position of the shift lens. When the anti-shake control is ON, the shift lens moves at each predetermined time according to the shift detected value. It is necessary to subtract the spring force from the integral control output because the spring force that is proportional to the position signal is added when the position of the shift lens changes. Accordingly, the attitude detection unit 211 calculates the thrust pertaining to a gravitation correction from the output value of the integral control unit 305 and the position signal of the shift lens, and estimates the gravitational acceleration. Thereby, the attitude can be detected. It is possible to detect the attitude of the camera by respectively performing the similar calculations relating to the pitch axis and yaw axis.

Figure 4:
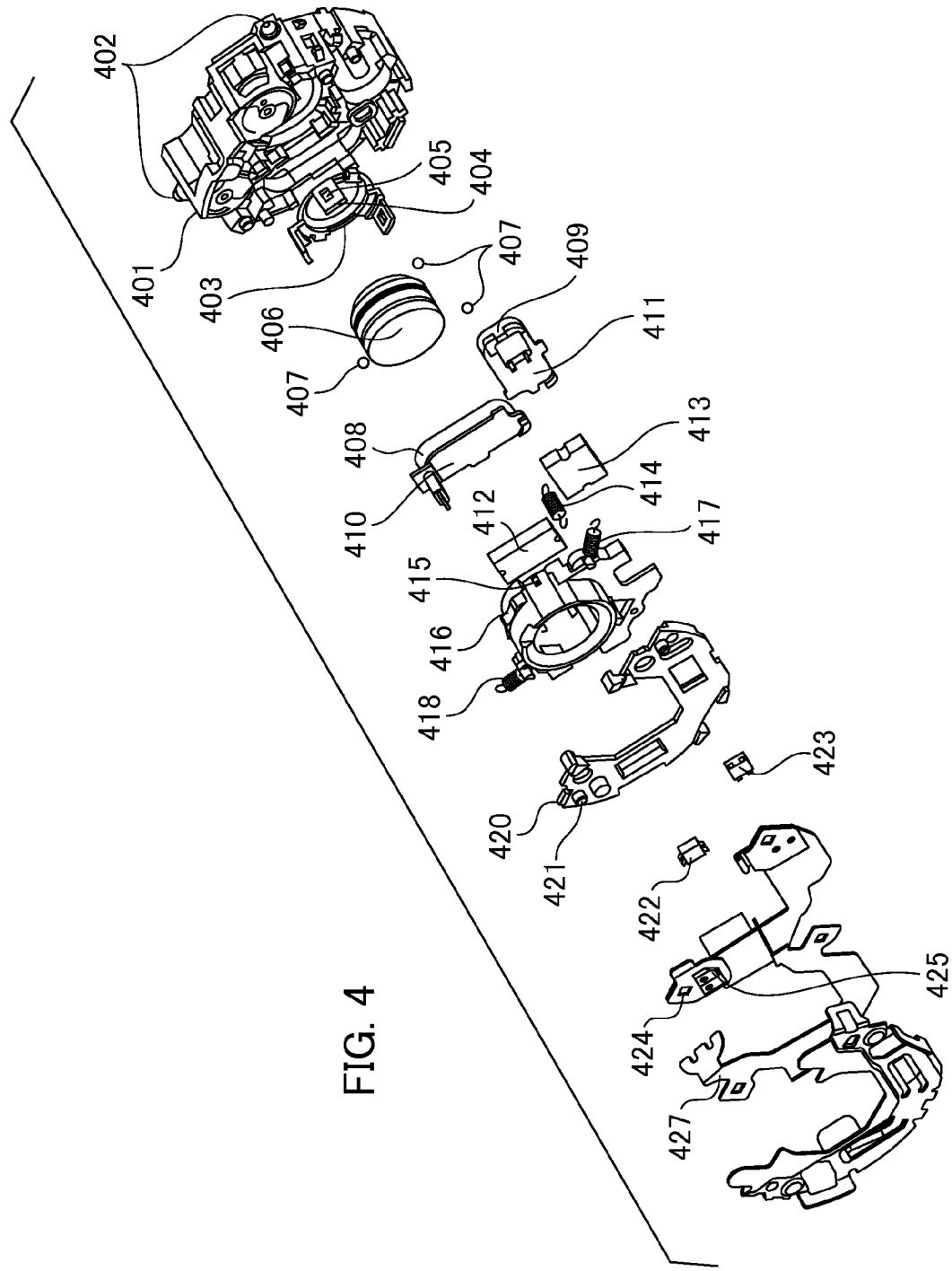
FIG. 4 is an exploded perspective view of a shake correction mechanism provided in the image pickup apparatus.

FIG. 4 is a perspective view of a shake correction mechanism (shake correction apparatus) provided in the image pickup apparatus shown in FIG. 1. 401 is a base that servers as a base of the shake correction mechanism. The base 401 fixingly holds a shutter mechanism and an ND filter mechanism. The base 401 is integrally provided with two follower pins 402 (illustrated), and provided with a moveable follower pin (not illustrated). Three followers are fit in three cam grooves of a cam cylinder (not illustrated) that is located the outside of the radial direction of the base 401, to move forwards and backwards in the optical axis direction along the cams.

406 is a correction lens group, and integrally held by a caulking claw (not illustrated) of a shift lens holder 416. The correction lens group 406 functions as the shift lens 103 shown in FIG. 1. 403 is a lens cover provided with an opening for limiting a luminous flux passing through the correction lens group 406. The lens cover 403 is provided with three arm parts 404 extending to the side surface and provided with openings 405 respectively corresponding to the arm parts 404, and the arm parts 404 and openings 405 are fit to projections 415 provided at three locations on the side surface of the shift lens holder 416, and integrally held to the shift lens holder 416. The magnets 412 and 413 are integrally held in the shift lens holder 416.

The shift lens holder 416 pressingly contact with the base 401 via rolling balls 407 which are made of three ball members, and the shift lens holder 416 is a movable member enabling flexibly moving in a plane perpendicular to the optical axis by the rolling of the rolling balls 407. That is, the base 401 is a fixing material for movably supporting the shift lens holder 416 in the plane perpendicular to the optical axis. The rolling balls 407 are pinched between the shift lens holder 416 and the base 401, and move the shift lens holder to the base while rolling in the receiving part formed in at least one surface of the shift lens holder and the base. According to this configuration, there is the effect of achieving the vibration with smaller amplitude and with a higher period than a method of guiding by a guide bar, and it is possible to perform the excellent correction in the digital camera whose pixels are being increased.

414 is a thrust spring urging the shift lens holder 416 toward the base 401.417 and 418 are radial springs for preventing the rotation of the shift lens holder 416. The thrust spring 414 is a tension spring. In the thrust spring 414, one end is engaged with a hooking nail 415 of the shift lens holder 416, and the other end is engaged with a hooking catch (not illustrated) of the base, to apply the energy.

408 and 409 are coils. 410 and 411 are resin bobbins for holding the coils. In the bobbin, metallic pins are integrally configured at the end, and the end part of the coil is hooked. The power is supplied by from a control circuit by soldering a conduction pattern of an FPC described below to the metallic pins.

424 is a flexible substrate (hereinafter, referred to as an FPC) for supplying power to the coils 408 and 409. In the FPC 424, the coils 408 and 409 are electrically connected to a land 425 by soldering via the metallic pins. In addition, 422 and 423 are Hall elements for detecting variation of a magnetic field. The Hall elements are located close to the magnets 412 and 413, detect the variation of the magnetic field in accordance with the movement of the magnet, and calculate the moving amount. The Hall elements are mounted on the FPC 424, and the power is supplied by the FPC 424.

426 is the FPC for supplying power to the shutter and an ND filter driving unit. 420 is an FPC holder for fixing the FPCs 424 and 426. The positioning and the fixing are performed in the FPC holder 420 by pressing the holes of the FPCs 424 and 426 to the cylindrical-shaped projections 421.

Figure 5:
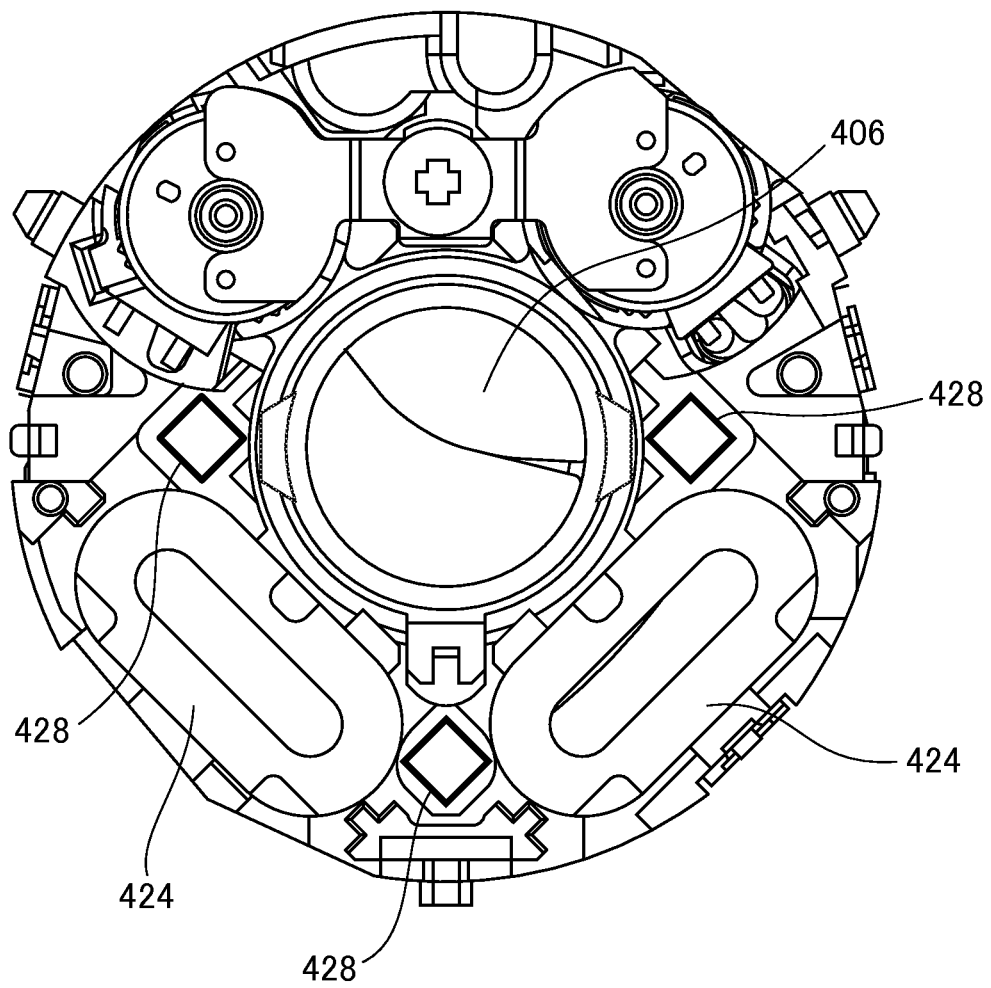
FIG. 5 is a front view of the shake correction mechanism seen from an object side.

FIG. 5 is a front view of the shake correction mechanism seen from an object side. In FIG. 5, 428 are ball receiving parts located at the triangle vertex formed by the rolling ball in the vicinity of the shift lens. A ceramic is used for the ball material and a molding material is used for the receiving part.

Figure 6A:
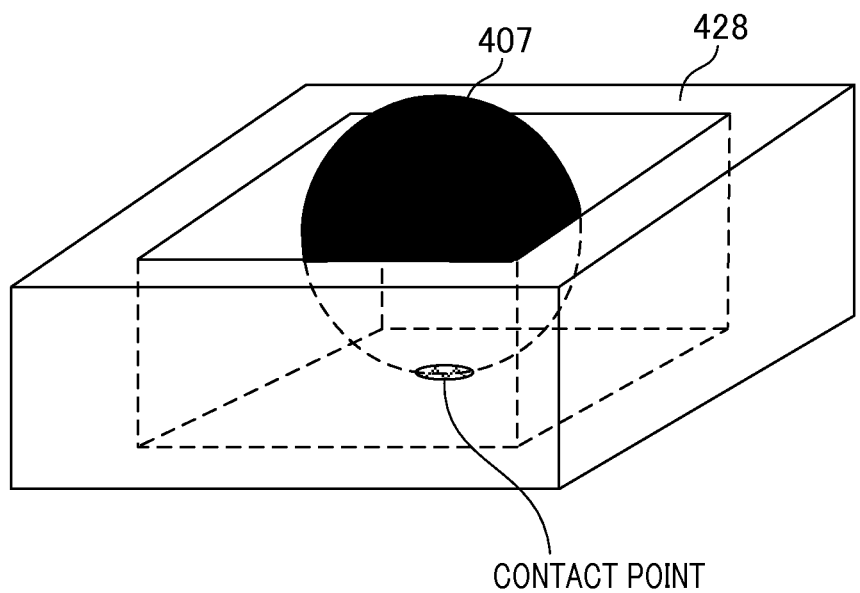
FIGS. 6A and 6B are explanatory diagrams of a location of a ball in a ball receiving part.
Figure 6B:
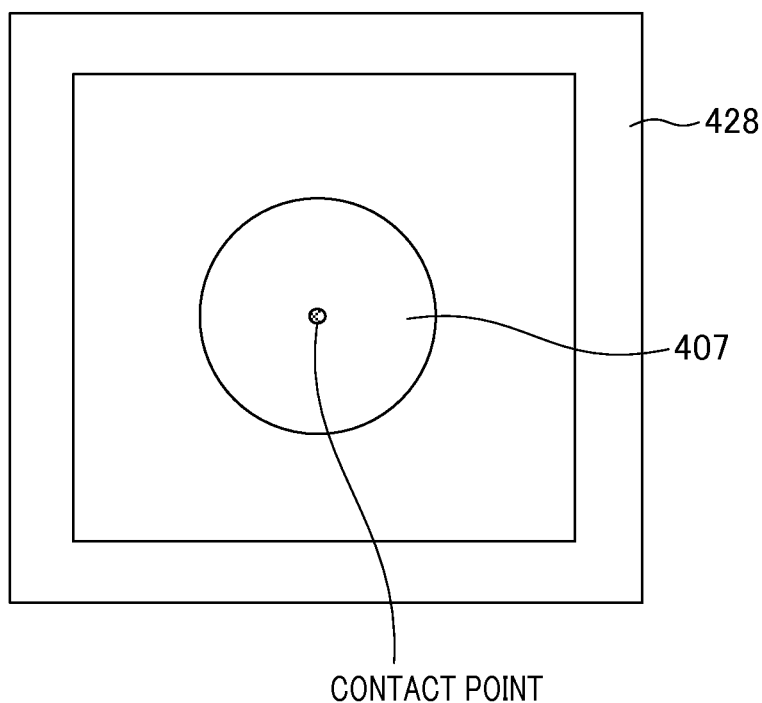

FIG. 6 is an explanatory diagram of the location of the ball in the ball receiving part. FIG. 6A three-dimensionally illustrates the location of the ball 407. FIG. 6B is a front view of FIG. 6A seen from the object side. In FIG. 6B, the contact points of the ball 407 and the ball receiving part 428 are coincident with the center of the ball 407. It is noted that, each of the ball receiving parts 428 is located at the triangle vertex formed by the ball 407 in the vicinity of the correction lens group 406, and three combinations of the ball receiving parts 428 and the balls 407 have the same configuration, and therefore one optional combination will be explained in the following explanation.

While it is desirable that the rolling ball is always in a rolling state in the structures shown in FIG. 4 to FIG. 6, a sliding friction becomes dominant in a state in which the rolling ball contacts the end face of the recessed part 428, so that the tracking decreases. Accordingly, during the shake correction operation, the initialization operation of the shift lens for moving the shift lens by the maximum moving amount or by the actual moving amount is performed in advance during the start-up so that the rolling ball is always in a rolling state. Thus, the initialization operation is performed during the start-up so as to enable obtaining the excellent anti-shake performance within the driving area of the shift lens.

Figure 7A:
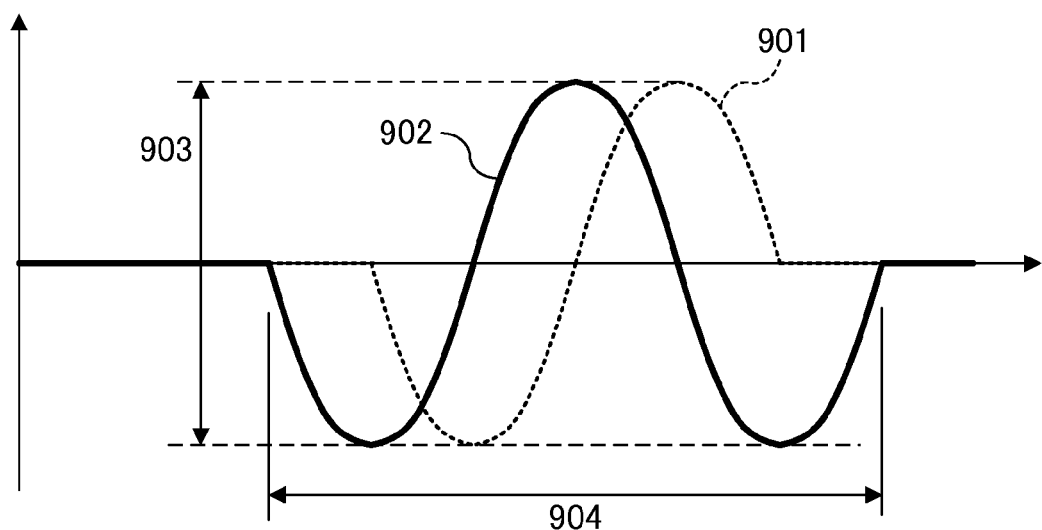
FIGS. 7A and 7B are explanatory diagrams of the position change of the shift lens during initialization driving.
Figure 7B:
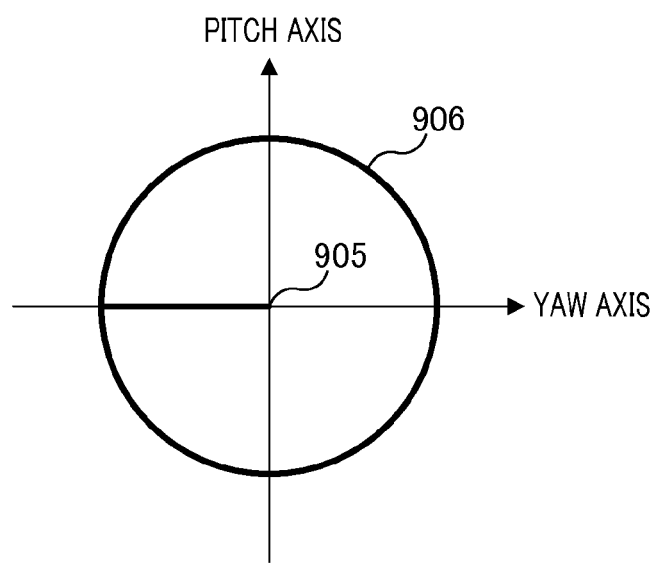
Figure 10:
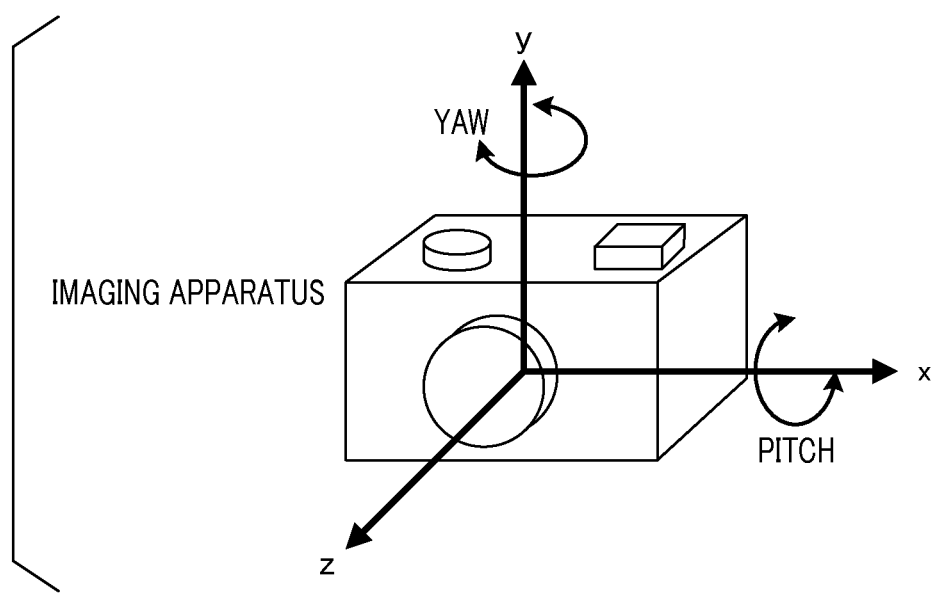
FIG. 10 is an explanatory diagram of the pitch direction and the yaw direction.

FIG. 7 is an explanatory diagram of the position change of the shift lens during the initialization driving. FIG. 7A is a time series graph of the initialization driving of the shift lens. 901 in FIG. 7A illustrates the position of the shift lens of the pitch axis during the initialization driving. 902 illustrates the position of the shift lens of the yaw axis. 905 illustrates a center of the optical axis. In addition, the vertical direction is the pitch direction, and the lateral direction is the yaw direction, in FIG. 7B.

903 shows a maximum amplitude of the initialization driving of the pitch axis and the yaw axis, and attains the diameter of a circle 906. Further, 904 shows a time required for the initialization driving. Here, the driving sound of the shift lens becomes larger according to increasing the size of the circle 906, and the driving sound of the shift lens becomes smaller according to decreasing the size of the circle 906. The frequency of the sound during the driving of the shift lens becomes lower according to prolonging the time 904, and the frequency of the sound during the driving of the shift lens becomes higher according to shortening the time 904.

In addition, since the driving speed of the shift lens becomes high when the time 904 is set short, the gain of the sound during the driving of the shift lens becomes large. In the case in which the driving sound of the shift lens is large, a harsh sound is generated each time the shift lens starts up, and as a result, the user has an uncomfortable feeling.

Here, while the smaller sound is desirable for the shift lens driving sound, the amplitude 903 is required to drive the shift lens at least by the actual moving amount. In addition, the time 904 influences the power source start-up time of the image pickup apparatus, so that if the initialization driving is performed during a very long time, the time between the pressing of the power button and the available timing of the photographing is prolonged, and as a result, the user may have an uncomfortable feeling.

FIG. 8 is an explanatory diagram of the examples of the initialization operation of the ball in the ball receiving part during the driving of the shift lens. As shown in FIG. 8, the vertical direction is the pitch direction, and the horizontal direction is the yaw direction. It is noted that 801 shows a center of the ball receiving part 428.

The movement of the ball during the initialization driving changes in the order of FIG. 8A, FIG. 8B, FIG. 8C, FIG. 8D, FIG. 8E, FIG. 8F, and FIG. 8G. In each drawing, a circle shown with a solid line shows a ball position at the current time, a dotted line shows the ball position at the previous time, and an arrow shows a track how the ball positions move between the previous time and the current time. In FIG. 8A, before the initialization operation of the circle, the initial ball position is positioned in the upper left direction away from the center 801 of the ball receiving part 428.

During the initialization driving, the ball 407 hits against a left wall surface of the ball receiving part 428, and then is moved to the right direction by a predetermined moving amount, as shown in FIG. 8B. Subsequently, the ball 407 hits against an upper wall surface of the ball receiving part 428, and is then moved downward by the predetermined moving amount, as shown in FIG. 8C. Therefore, in a case where the shift lens is moved within the amplitude of the initialization operation of the circle after the initialization operation of the circle, the ball 407 does not hit the wall surface of the ball receiving part 428.

Here, the start-up of the camera will be explained. When a power source switch of the camera is turned on, the power source is supplied from the power source unit 115 to the total system depending on the use. The camera has several start-up modes. One start-up mode is a photographing start-up mode where the lens barrel of the image pickup apparatus is moved to a photographable state. In order to turn the image pickup apparatus into the photographable state, the initializations of the zoom unit 101, the shift lens 103, the aperture-shutter unit 105, and the focus unit 107 are respectively performed also in the lens barrel.

There are inconveniences relating to the initialization driving sound and the initialization driving time described above in the initialization operation of the shift lens, but there are cases that the inconveniences relating to the initialization driving sound and the initialization driving time can be solved. Here, the structure in the present embodiment is one in which the lens barrel moves between the positions of the collapsed state and the extended state, and the total length thereof can be changed between the collapsed state and the extended state. For example, the zoom unit 101, the shift lens 109, the aperture-shutter unit 105, and the focus unit 107 are located in the lens barrel, and each lens group changes the optical axis direction position between the extended state and the collapsed state.

During the start-up accompanying the operation in which the lens barrel shifts from the collapsed state to the extended state, the initialization of the zoom unit 101 especially requires the most time among the initializations of each unit in the lens barrel. Accordingly, the inconvenience relating to the time extension of the start-up due to the influence of the initialization driving of the shift lens does not occur if the initialization of the shift lens 103 is simultaneously performed during the initialization of the zoom unit 101, and the initialization driving of the shift lens is completed before the completion of the initialization of the zoom unit 101.

In addition, during the driving of the zoom unit 101, a zoom driving sound that is larger than the initialization driving sound of the shift lens 103 occurs, and therefore the initialization driving sound is not so conspicuous. In this manner, it is possible to solve the inconveniences relating to the initialization driving sound and the initialization driving time of the shift lens when the initialization of each unit in the lens barrel is performed, during the start-up accompanying the operation in which the lens barrel shifts from the collapsed state to the extended state.

However, there are cases in which the initialization operation of the shift lens is performed while the lens barrel remains in the collapsed state. It is necessary to perform the feedback control of the shift lens for detecting the attitude, in a case where the start-up mode where the lens barrel remains in the collapsed state during the start-up of the image pickup apparatus is set, the signal in the gravity direction is extracted from the driving unit of the shake correction mechanism (shake correction apparatus) to detect the attitude, and the rotating process of the photographing image data is performed. Therefore, in this case, the image pickup apparatus performs the initialization operation of the shift lens while the lens barrel remains in the collapsible manner.

The start-up mode where the lens barrel is in the collapsed state during the start-up of the image pickup apparatus is, for example, a play start-up mode which is effective only for the function for displaying the photographing image on the display unit attached to the camera such as an LCD. In the start-up mode where the lens barrel is in the collapsed state during the start-up of the image pickup apparatus, the initialization of the shift lens is independently performed since the initializations for the other lenses in the lens barrel are not performed. Then, the sound is conspicuous when the initialization operation sound is large because factors for generating the other sounds are not found in the camera, and as a result, the user may have an uncomfortable feeling. In addition, when the initialization operation time is prolonged to turn down the sound volume, the inconvenience in which the start-up time is prolonged is caused. Further, while the gain of the sound is decreased when the initialization operation time is prolonged, the frequency of the sound is lowered, so that the initialization driving sound may be more conspicuous.

In the play start-up mode, it is not necessary for the shift lens to perform the anti-shake control, so that the tilt detection can be performed by holding the shift lens at the fix position and performing the feedback control of the shift lens. That is, the large amplitude is not required in the initialization operation during the play start-up. However, there are cases in which the ball position is displaced in a case where an impact force is applied to the camera and the like, so that it is necessary to perform the initialization operation by the amplitude of the displace of the ball position that is presumed due to the impact force in the control at the fix position of the shift lens.

Here, in the play start-up mode, it is possible to decrease the amplitude of the initialization operation compared to during the start-up of the photographing, so that it is possible to make the initialization driving sound during the play start-up substantially inconspicuous. When the amplitude of the initialization operation is reduced, the gain of the sound is small, and therefore the sound is substantially inconspicuous even when the initialization operation time is changed and the frequency of the sound is changed. Accordingly, it is also possible to shorten the initialization operation time.

That is, in the image pickup apparatus in the present embodiment, during the play start-up, the initialization operation sound can be reduced and the start-up time during the play start-up time can be shortened by decreasing the amplitude of the initialization operation and by shortening the initialization operation time.

FIG. 9 is a flowchart explaining the initialization operation of the shift lens in the image pickup apparatus in the present embodiment. The control unit 119 provided in the image pickup apparatus converts the driving amplitude and the driving speed of the initialization driving of the shift lens 103 according to the start-up mode of the image pickup apparatus.

Firstly, in step S901, when the power source of the image pickup apparatus is turned on, the process is forwarded to step S902, and the control unit 119 determines whether or not the lens barrel is in the extended state. In brief, the control unit 119 determines that the start-up mode is either a first start-up mode that is not accompanying the extension of the lens barrel or a second start-up mode that accompanies the extension of the lens barrel.

In a case where the lens barrel is in the extended state, the start-up mode accompanying the extension of the lens barrel is used. Accordingly, in this case, the process is forwarded to step S903. In a case where the lens barrel is not in the extended state, the start-up mode is the start-up mode (for, example, the play start-up mode) not accompanying the extension of the lens barrel. Accordingly, in this case, the process is forwarded to a step S912.

In step S903, the control unit 119 determines whether or not an initialization end flag 1 is OFF. The initialization end flag 1 is a flag representing whether the initialization driving of the shift lens in step S907 is performed or not.

In the case where the initialization end flag 1 is off, the process is forwarded to step S904, and the control unit 119 turns on the power source for driving the shift lens, and then the process is forwarded to step S905. In step S905, the control unit 119 sets the amplitude of the initialization driving. Specifically, the control unit 119 sets the amplitude Amp (903 in FIG. 7) of the initialization driving to a1. The control unit 119 sets the driving time of the initialization driving in step S906. Specifically, the control unit 119 sets the driving time (904 in FIG. 7) of the initialization driving to b1, and then the process is forwarded to step S907.

In step S907, the control unit 119 performs the initialization driving of the shift lens. Specifically, the control unit 119 executes the initialization operation as explained using the FIG. 7 and FIG. 8, with the initialization driving amplitude and the initialization driving time that have been set in step S906 and step S907. In step S908, the control unit 119 sets the initialization end flag 1 to ON, and prevents the initialization operation until the power source is turned OFF. Then, the process is forwarded to step S909.

In a case where the initialization end flag 1 is ON in the determination process in step S903, the initialization driving (S907) has already been performed once, so that it is not necessary to perform the initialization operation again. Accordingly, in this case, the processes from the step S904 to the step S908 are not executed, and the process is forwarded to step S909.

In step S909, the control unit 119 determines whether or not an image shake correcting function is ON. In the case where the image shake correcting function is ON, the process is forwarded to step S910. Then, the control unit 119 performs the anti-shake control, and the process is forwarded to step S920.

In a case where the image shake correcting function is OFF, the process is forwarded to step S911. Then, the control unit 119 sets the anti-shake control to OFF, and fixes the shift lens to the center position of the optical axis, and then the process is forwarded to step S920.

In step S912, the control unit 119 determines whether or not the initialization end flag 2 is OFF. The initialization end flag 2 is a flag representing whether or not the initialization driving of the shift lens in step S917 is performed.

In the case where the initialization end flag 2 is OFF, the process is forwarded to step S913. In step S913, the control unit 119 determines whether or not a request for the tilt detection exists. In a case where the attitude of the camera is detected when the photographing image stored in the storage unit 118 is displayed on the display unit 112 (for example, LCD), and the rotation of the display image is required according to the attitude, the control unit 119 determines the request for the tilt detection exists. For example, in a case where the images to be displayed do not exist, or the image pickup apparatus is connected to an external display device, it is not necessary to perform the tilt detection. Accordingly, in this case, the control unit 119 determines that the request for the tilt detection does not exist. Here, in the case where the request for the tilt detection exists, the process is forwarded to step S914. Subsequently, the control unit 119 turns on the power source for driving the shift lens, and the process is forwarded to step S915.

In step S915, the control unit 119 sets the amplitude of the initialization driving. Specifically, the control unit 119 sets the driving amplitude Amp (903 in FIG. 7) of the initialization driving to a2. In this case, it is not necessary to drive with a large amplitude, and therefore the relation between a1 and a2 is a1>a2.

In step S916, the control unit 119 sets the driving time of the initialization driving. Specifically, the control unit 119 sets the driving time (904 in FIG. 7) of the initialization driving to b1. In this case, it is not necessary to perform driving for a long time, and therefore the relation between b1 and b2 is b1>b2.

In step S917, the control unit 119 executes the initialization operation as explained using the FIG. 7 and FIG. 8, with the driving amplitude and the driving time which are set in step S916 and step S917. In step S918, the control unit 119 sets the initialization end flag 2 to ON, and prevents the initialization operation 2 until the power source is turned OFF. Subsequently, the process is forwarded to step S919. In step S919, the control unit 119 sets the anti-shake control to OFF, and fixes the shift lens to the center position of the optical axis, and then the process is forwarded to step S920.

In the case where the request for the tilt detection does not exist in the determination process in step S913, it is not necessary to perform the initialization operation. Accordingly, in this case, the process returns to step S902, the determinations are repeated, and the process enters a standby state until the lens barrel is extended or the request for the tilt detection exists.

In the case where the initialization end flag 2 is ON in the determination process in step S912, the initialization driving (S917) has already performed once, so that it is not necessary to perform the initialization operation 2 again. Accordingly, in this case, the processes from step S913 to step S919 are not executed, and the process is forwarded to step S920 without performing the initialization operation 2.

It is noted that, in this example, the initialization end flag 1 and the initialization end flag 2 are respectively provided. Subsequently, while the initialization driving of the shift lens (S917) is not performed again as long as the power source of the image pickup apparatus is not turned off after the initialization end flag 2 is set to ON, the initialization driving of the shift lens (S907) is performed when the lens barrel is extended. That is, in a case where NO is selected in step S921 after the initialization driving in step S917 is performed, the process is returned to step S902, and then the driving amplitude and the driving speed of the shift lens are respectively changed to a1 and b1, and the initialization driving is executed again. After the initialization driving of the shift lens (S907) is performed when the lens barrel is extended, the initialization end flag 1 is set to ON, and then the initialization driving of the shift lens (S907) is not performed again and initialization driving (S917) is not also performed as long as the power source of the image pickup apparatus is not turned off.

In step S920, the control unit 119 determines the tilt detection, that is, detects the attitude of the image pickup apparatus through the instruction to the attitude detection unit 211, and determines whether the rotation is required or not. In a manner that the process is forwarded to the step S920, the power source for driving the shift lens has already turned on, the anti-shake control or the fixture at the center of the shift lens is performed, and therefore the tilt detection is available. After the tilt detection is determined, the process is forwarded to the step S921.

In step S921, the control unit 119 determines whether or not the power source switch is turned off, and the process is returned to step S902 if the power source switch is not turned off, and the above determinations are repeated. In the case where the power source switch is turned off in step S921, the process is forwarded to step S922. Subsequently, the control unit 119 sets the initialization end flag 1 to OFF, and the process is forwarded to step S923. The control unit 119 sets the initialization end flag 2 to OFF, and the process is forwarded to step S924. In step S924, the control unit 119 turns off the power source for driving the shift lens. Subsequently, in step S925, the control unit 119 turns off the power source of the image pickup apparatus.

According to the image pickup apparatus in the present embodiments, the amplitude and the time of the initialization operation of the shift lens 103 are changed depending on the start-up modes of the image pickup apparatus. The control unit 119 decreases the amplitude and the time of the initialization operation during the start-up in the collapsed state of the lens barrel, compared those during the start-up in the extended state of the lens barrel. Specifically, the control unit 119 executes the following operations in a case where the start-up mode of the image pickup apparatus is the first start-up mode not accompanying the move of the lens barrel from the position of the collapsed state to the position of the extended state. The control unit 119 sets the driving amplitude and the driving speed of the initialization driving to first driving amplitude and a first driving speed which are smaller than second driving amplitude and a second driving speed. It is noted that, in a case where the start-up mode of the image pickup apparatus is the start-up mode not accompanying the extension of the lens barrel, the control unit 119 determines whether or not the processes from S915 to S917 are executed based on the attitude of the detected image pickup apparatus (S913).

According to the image pickup apparatus in the present embodiments, it is possible to reduce the driving sound of the initialization operation of the shift lens and to shorten the start-up time of the image pickup apparatus, during the start-up (for example, during the play start-up) in the collapsed state of the lens barrel.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-255091, filed Dec. 10, 2013, which is hereby incorporated by reference herein in its entirety.

What is claimed is:

1. A shake correction apparatus comprising:
   a lens barrel configured to move in an optical axis direction between a position of a collapsed state and a position of an photographing state;
   a correcting unit configured to optically correct an image shake based on an output of a shake detecting unit;
   a moving member configured to hold the correcting unit;
   a fixing member configured to regulate a movement of the moving member in an optical axis direction;
   a rotating member configured to be interposed between the moving member and the fixing member and to be relatively moveable to the respective moving member and fixing member;
   a driving unit configured to drive the moving member; and
   at least one processor or circuit configured to perform the operations of units comprising a control unit configured to perform control of initialization driving of the moving member for directing the rotating member to a center position in a driving area,
   wherein, where the start-up mode of the shake correction apparatus is a first start-up mode not accompanying the movement from the position of the collapsed state to the position of the photographing state, the control unit sets an amplitude of the initialization driving of the moving member to a first driving amplitude that is smaller than the amplitude where the start-up mode of the shake correction apparatus is a second start-up mode accompanying the movement from the position of the collapsed state to the position of the photographing state.

2. The shake correction apparatus according to claim 1, further comprising:
   a display unit configured to display the photographed image,
   wherein the control unit sets the amplitude of the initialization driving of the moving member to the first driving amplitude and performs the initialization driving of the moving member when determining that the image displayed by the display unit is required to rotate in response to an attitude of the shake correction apparatus based on the attitude of the image pickup apparatus, in the case where the start-up mode of the shake correction apparatus is the first start-up mode.

3. A control method of the shake correction apparatus including (a) a lens barrel configured to move in an optical axis direction between a position of a collapsed state and a position of an photographing state, (b) a shake detecting unit configured to detect a shake of the shake correction apparatus, (c) a correcting unit configured to optically correct an image shake based on an output of the shake detecting unit, (d) a moving member configured to hold the correcting unit, (e) a fixing member configured to regulate a movement of the moving member in an optical axis direction, (f) a rotating member configured to be interposed between the moving member and the fixing member and to be relatively moveable to the respective moving member and the fixing member, and (g) a driving unit configured to drive the moving member, the control method comprising:

performing initialization driving of the moving member for directing the rotating member to a center position in a driving area, wherein in the performing initialization driving, where the start-up mode of the shake correction apparatus is a first start-up mode not accompanying the movement from the position of the collapsed state to the position of the photographing state, an amplitude of the initialization driving of the moving member is set to a first driving amplitude that is smaller than the amplitude where the start-up mode of the shake correction apparatus is a second start-up mode accompanying the movement from the position of the collapsed state to the position of the photographing state.

4. A shake correction apparatus comprising:

a lens barrel configured to move in an optical axis direction between a position of a collapsed state and a position of an photographing state;

a correcting unit configured to optically correct an image shake based on an output of a shake detecting unit;

a moving member configured to hold the correcting unit;

a fixing member configured to regulate a movement of the moving member in an optical axis direction;

a rotating member configured to be interposed between the moving member and the fixing member and to be relatively moveable to the respective moving member and fixing member;

a driving unit configured to drive the moving member; and at least one processor or circuit configured to perform the operations of units comprising a control unit configured to perform control of initialization driving of the moving member for directing the rotating member to a center position in a driving area, wherein, where the start-up mode of the shake correction apparatus is a first start-up mode not accompanying the movement from the position of the collapsed state to the position of the photographing state, the control unit sets a speed of the initialization driving of the moving member to a first driving speed that is smaller than the speed where the start mode of the shake correction apparatus is a second start-up mode accompanying the movement from the position of the collapsed state to the position of the photographing state.

5. The shake correction apparatus according to claim 4, further comprising:

a display unit configured to display the photographed image, wherein the control unit sets the speed of the initialization driving of the moving member to the first driving speed and performs the initialization driving of the moving member when determining that the image displayed by the display unit is required to rotate in response to an attitude of the shake correction apparatus based on the attitude of the shake correction apparatus, in the case where the start-up mode of the shake correction apparatus is the first start-up mode.

6. An control method of the shake correction apparatus including (a) a lens barrel configured to move in an optical axis direction between a position of a collapsed state and a position of an photographing state, (b) a shake detecting unit configured to detect a shake of the shake correction apparatus, (c) a correcting unit configured to optically correct an image shake based on an output of the shake detecting unit, (d) a moving member configured to hold the correcting unit, (e) a fixing member configured to regulate a movement of the moving member in an optical axis direction, (f) a rotating member configured to be interposed between the moving member and the fixing member and to be relatively moveable to the respective moving member and the fixing member, and (g) a driving unit configured to drive the moving member, the control method comprising:

performing initialization driving of the moving member for directing the rotating member to a center position in a driving area, wherein in the performing initialization driving, where the start-up mode of the shake correction apparatus is a first start-up mode not accompanying the movement from the position of the collapsed state to the position of the photographing state, a speed of the initialization driving of the moving member is set to a first driving speed that is smaller than the speed where the start mode of the shake correction apparatus is a second start-up mode accompanying the movement from the position of the collapsed state to the position of the photographing state.

* * * * *